(12) United States Patent
Lin et al.

(10) Patent No.: US 6,514,311 B1
(45) Date of Patent: Feb. 4, 2003

(54) CLEAN PROCESS OF RECOVERING METALS FROM WASTE LITHIUM ION BATTERIES

(75) Inventors: Jiunn-Ren Lin, Hsinchu (TW); Chang Fan, Hsinchu (TW); I-Long Chang, Hsinchu (TW); Jer-Yuan Shiu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/984,594

(22) Filed: Oct. 30, 2001

(51) Int. Cl.[7] .............................. C25C 1/08; C25C 1/12
(52) U.S. Cl. ..................... 75/424; 75/425; 205/582; 205/587; 429/29; 423/111; 423/144; 423/186
(58) Field of Search .................. 75/424, 425; 205/582, 205/587; 429/29; 423/111, 144, 186

(56) References Cited

U.S. PATENT DOCUMENTS 5,045,160 A * 9/1991 Hanulik ..................... 75/724
5,491,037 A * 2/1996 Kawakami ................. 429/49

* cited by examiner

Primary Examiner—Melvyn Andrews
(74) Attorney, Agent, or Firm—Bacon & Thomas

(57) ABSTRACT

A process of recovering metals from waste lithium ion batteries, wherein the waste batteries are calcined and sieved to generate an ash containing metals and metal oxides. The invented process includes subjecting the ash to a dissolution etching treatment, and a filtration treatment, and separately using a membrane electrolysis method to separate out metal copper and cobalt, wherein the acid generated on the cathode side in the electrolysis process can be recovered through a diffusion dialysis treatment. After electrolysis, the solution rich in lithium ion, after precipitating the metal impurities by adjusting the pH value, can be added with a carbonate ion to form a lithium carbonate.

11 Claims, 2 Drawing Sheets

US 6,514,311 B1

CLEAN PROCESS OF RECOVERING METALS FROM WASTE LITHIUM ION BATTERIES

FIELD OF THE INVENTION

The present invention relates to a process for recovering metals from a waste lithium ion battery, particularly a process for recovering copper, aluminum, iron and cobalt, as well as lithium carbonate, from a waste lithium ion battery.

BACKGROUND OF THE INVENTION

Due to its merits, such as a high electrical energy density, a high working voltage, a long cyclic life and no memory effect, etc., the lithium ion battery has been recognized as a battery system with a high potential for development. Currently, in addition to being widely used in various 3C products, the lithium ion battery is expected to replace batteries of lead acid, Ni—Cd and Ni—H, etc. and becomes a power source for electric cars. By then, the use of lithium ion batteries will grow in multiples. Therefore, along with an increase on the use of lithium ion batteries, a system for recycling and regenerating waste lithium ion batteries should be developed to solve the problems of contamination and risk associated with the use of lithium ion batteries.

In comparison with a lithium ion primary battery, a lithium ion secondary battery uses a lithium oxide, that has a better stability, as a material for the positive electrode. However, during the process of repetitive charge/discharge, the lithium ion secondary battery still has the occurrence of dendrite of lithium metal. Furthermore, when some material (e.g. $LiPF_6$, $LiClO_4$, $LiSO_2$, $LiBF_4$ etc.) commonly used as an electrolyte of the lithium battery come into contact with air or moisture, these material will generate contamination to the natural environment or cause harm to a person's safety. Among the lithium ion secondary batteries that have been commercially mass produced, their positive electrode material mainly is an oxide of lithium-cobalt. Due to the fact that only a small amount of cobalt is available in the natural environment and cobalt is a valuable metal in military applications, the metal cobalt has a high economic value for recycling.

However, since the techniques for commercially producing the lithium ion secondary batteries are becoming mature only in the recent decade, patent documents related to the recycling of used or waste lithium ion batteries are made public only in recent years. A known process in recycling a waste lithium ion battery includes calcining the batteries in a high temperature furnace to decompose the organic materials in the battery, smashing and sieving the battery, and separating and purifying valuable metals. These techniques can be divided into a physical selection method and a purification method by chemical dissolution.

Physical Selection Method

Japanese patents JP10074539, JP10158751, JP10223264, JP10330855, JP11242967 use physical selection methods. They are characterized in that a waste lithium battery is pulverized to a particle size of less than 5 mesh (or 3.36 mm), and then separated into different metals by an alternate use of processes, such as sieving, magnetic selection, gravity selection or eddy current, using the particles' physical properties, such as particle size, magnetic property, specific gravity, and electric property, etc. However, as known to the public, metals separated according to their physical properties do not have a high quality. In addition to a satisfactory result can be reached by using a magnetic selection method to recycle iron, other recycled metals are limited in quality by their nature and can not reach a high quality obtained by other methods, such as a wet metallurgy. The reasons include that many metals do not have a high selectivity by their physical properties (such as aluminum and copper in this system), and absolute values of the magnetic or electric properties of the pulverized metal particles are related to the size thereof.

Purification by Chemical Dissolution

A method of purification by chemical dissolution mainly comprises dissolving the positive electrode material of a lithium ion battery containing a Li—Co oxide, and forming a hydroxide or metal compound with a low solubility by adjusting the pH value to recycle valuable metals. A method disclosed in JP7207349 comprises sieving a waste lithium ion battery, which has received a pre-treatment; dissolving the under size portion with an acid; and directly adjusting the pH value to recycle the metal hydroxides. JP11054159 uses nitric acid to dissolve the positive electrode material, and uses lithium hydroxide to adjust the pH value to recycle the metal hydroxides. JP11185834 uses hydrochloric acid to dissolve the positive electrode material of a waste lithium battery, and adds oxalic radicals into the solution to form a precipitation of cobalt oxalate.

SUMMARY OF THE INVENTION

The present invention discloses a process for recovering metals from waste batteries including lithium ion batteries, wherein said waste batteries are calcined and sieved to generate an ash containing metals and metal oxides. Said process comprises the following steps:

a) dissolving said ash with a 3N–6N hydrochloric acid aqueous solution containing sodium chloride;

b) using the dissolved solution formed in step a) as a cathode solution and an aqueous solution of salt or acid as an anode solution, and using a current density of 0.001–0.01 ampere/cm$^2$ to perform a membrane electrolysis in a first electrolysis tank divided into a cathode well and an anode well by a cationic exchange membrane, thereby forming by reduction a copper metal on a cathode in said cathode well, wherein hydrogen ions formed in said anode solution penetrate through said cationic exchange membrane, and combine with the chlorine ions in said cathode solution to form hydrochloric acid;

c) withdrawing said cathode solution from said first electrolysis tank, and applying a diffusion dialysis on said cathode solution, thereby obtaining an aqueous solution of hydrochloric acid and a solution with an elevated pH value, wherein said aqueous solution of hydrochloric acid can be recycled for the use in dissolution in step a);

d) using said solution with an elevated pH value from step c) as a cathode solution and an aqueous solution of salt or acid as an anode solution, and using a current density of 0.01–0.05 ampere/cm$^2$ in a second electrolysis tank divided into a cathode well and an anode well by a cationic exchange membrane to perform a membrane electrolysis, wherein the pH value of said cathode solution is controlled to be over 1.5 during said membrane electrolysis process, thereby forming by reduction a cobalt metal on a cathode in said cathode well;

e) withdrawing said cathode solution from said second electrolysis tank, and adjusting the pH value thereof to 5–7, thereby forming a precipitation of $Fe(OH)_3$ and $Al(OH)_3$;

f) performing a solid/liquid separation on the resulting mixture from step e); and g) adding a water soluble carbonate into the aqueous solution separated in step f), thereby forming a precipitation of lithium carbonate.

Preferably, step e) of the present invention comprises applying a diffusion dialysis treatment on said cathode solution, thereby obtaining an aqueous solution of hydrochloric acid and a solution with an elevated pH value, and selectively adding sodium hydroxide into said solution with an elevated pH value, wherein said aqueous solution of hydrochloric acid can be recycled for the dissolution in step a).

Preferably, the pH values in step d) and step e) of the present invention are controlled or adjusted by adding sodium hydroxide.

Preferably, the water soluble carbonate in step g) of the present invention is sodium carbonate.

Preferably, the method according to the present invention further comprises smashing said calcined product, and collecting the smashed product passing through a screen of 20-5 mesh during smashing. More preferably, the process according to the present invention further comprises separating said smashed product with a screen of 10-5 mesh, thereby obtaining an under size portion containing the ash containing metals and metal oxides, and a portion remained on the screen.

Preferably, the process according to the present invention further comprises separating iron from the portion remained on the screen by a magnetic selection process. More preferably, the process according to the present invention further comprises separating copper and aluminum from the residue generated after the magnetic selection by an eddy current selection process.

Preferably, said 3N–6N hydrochloric acid aqueous solution containing sodium chloride in step a) of the present invention has a concentration of sodium chloride of 50–300 g/liter.

Preferably, the hydrochloric acid aqueous solution containing sodium chloride in step a) of the present invention has a temperature of 60–100° C., and the dissolving process is carried out where 5–20 g of the hydrochloric acid aqueous solution containing sodium chloride is used per gram of said ash.

In addition to incorporating the advantages of a physical selection method and a purification method by chemical dissolution, the process according to the present invention also uses a membrane electrolysis process to recover valuable metals in their metal state. Different from smashing a waste lithium ion battery into fine particles and performing the selection process in the prior art, the process according to the present invention comprises smashing the enclosure of a battery and the Cu/Al foil positive/negative electrode materials, that has been coated with Li—Co oxides or carbon powder, into large fragments of more than 3.36 mm (a screen with 5 mesh or lower), thereby reducing the consumption during the smashing process, and increasing the efficiency in separating the copper and aluminum foils in the eddy current selection process. Furthermore, the present invention uses hydrochloric acid to replace sulfuric acid, that has been used conventionally, and uses a membrane electrolysis system to replace a conventional electrolysis process, thereby greatly increasing the dissolution effect while solving the problem of industrial safety caused by the generation of chlorine gas during an electrolysis process using a hydrochloric acid system. Furthermore, the hydrochloric acid generated in a membrane electrolysis process can be recycled to the dissolution system, thereby forming a close system. This is also a characteristic of the present invention. The process according to the present invention can perform a complete treatment on a whole waste lithium ion battery, and recover almost all of the valuable metals.

Compared to a conventional physical selection method, the invented process recovers metals at a higher quality. Furthermore, a mixture of oxides of lithium and cobalt and ash, which can not be processed by a physical selection method, is treated by dissolution and membrane electrolysis to recover metals therefrom according to the invented process. Therefore, the recovery of metal cobalt can be greatly increased. Furthermore, a conventional chemical dissolution purification method recovers a metal in its metal compound form. Therefore, such a method usually can not handle too many types of metal impurities. Its treatment subject is usually limited to the positive electrode material in a battery. Furthermore, its recovered product is a cheap metal compounds in comparison with pure copper and cobalt metals recovered by the process according to the present invention.

DETAILED DESCRIPTION OF THE PRESENT INVENTION

At present, commercial lithium ion secondary batteries, according to their characteristics of applications, mainly can be divided into a cylindrical type and a square type. However, regardless of their configuration, most of them are made by coating a lithium-cobalt oxide on an aluminum foil as a positive electrode plate, coating a carbon material on a copper foil as a negative electrode plate, inserting a barrier membrane between the two plates, filling the space with an electrolyte solution, winding and compressing the composite to a desired specification, installing a conductive stem, a release safety valve and an end cover, etc., sealing the battery with an iron or aluminum can body, and encasing the battery with a plastic enclosure. Therefore, the elements involved in the processing of a waste lithium battery include metals of iron, aluminum, coppers cobalt and lithium and a non-metal, graphite.

Figure 1:
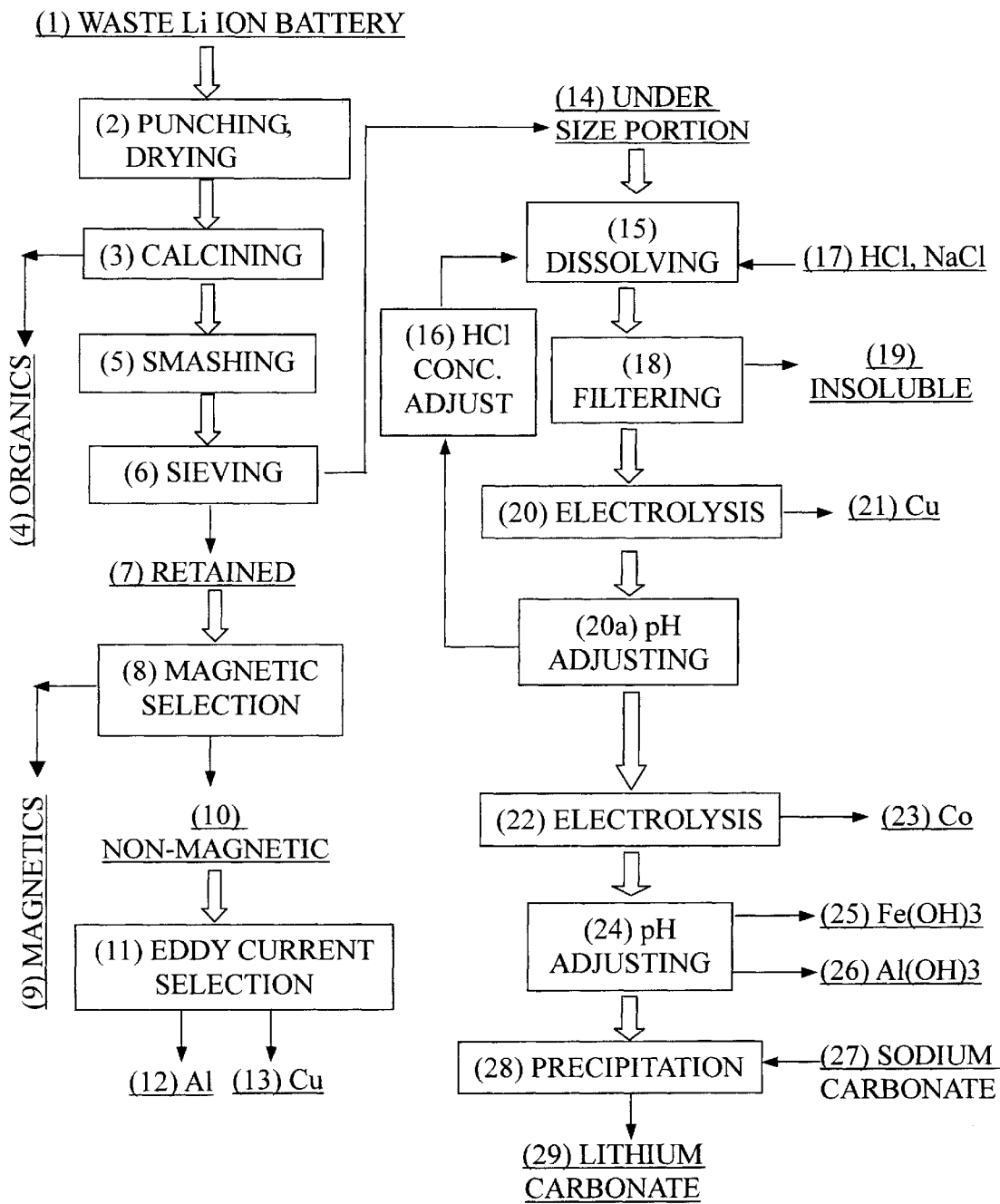
FIG. 1 is a flow chart block diagram of a preferred embodiment of a process according to the present invention.

The process according to the present invention uses the advantages of a physical selection method and a chemical dissolution purification method, and incorporate a membrane electrolysis to completely re-source a waste lithium ion battery. The process according to the present invention is explained together with the flowchart in FIG. 1. First, in order to avoid the danger of explosion caused by an excessive internal pressure of a lithium ion battery during the calcination process, a waste lithium ion battery (1) (or a defective product from the production process) was punched and dried (2). The battery then was put into a high temperature furnace to be calcined at 500° C.–800° C. for 3–30 minutes (3). The organic materials (4) in the battery were decomposed by the high temperature and formed carbon dioxide or carbon monoxide, etc. Meanwhile, a coke could also deposit in the battery. During which, a portion of the metal oxides in the battery could be reduced into metal. The waste lithium ion battery material, after calcining, was then fed into a smashing system (5). Said smashing system used a screen with 0.5 mesh or above to output the smashed scraps. Wherein copper foils, aluminum foils and iron/ aluminum enclosure, due to their better ductility, had a larger particle size after smashing. The lithium and cobalt oxides and the carbon material were nearly all smashed into a powder. A vibration sieve (6) with an appropriate mesh (preferably larger than 50 mesh) was used to separate metal scraps, including copper foils, aluminum foils and iron enclosure, etc., from a mixture including the lithium and cobalt oxides and the ash. After sieving, a retained portion (7) and an under size portion (14) were obtained.

The retained portion (7) was separated into a magnetic material (9) and a non-magnetic material (10) by a magnetic selection (8) means. Said magnetic material mainly comprised iron scraps (9). Said non-magnetic material (10) was separated into metal aluminum (12) and metal copper (13) by an eddy current selection (11).

Said under size portion (14) was added to 3–6 N hydrochloric acid aqueous solution containing 50–300 g/liter of sodium chloride (17) with a liquid-solid ratio of 5–20 for 0.5–2 hours (15), wherein the solution was kept at 60–100° C. Subsequently, a filtration facility (18) was used to filter out the insoluble carbon material (19).

Figure 2:
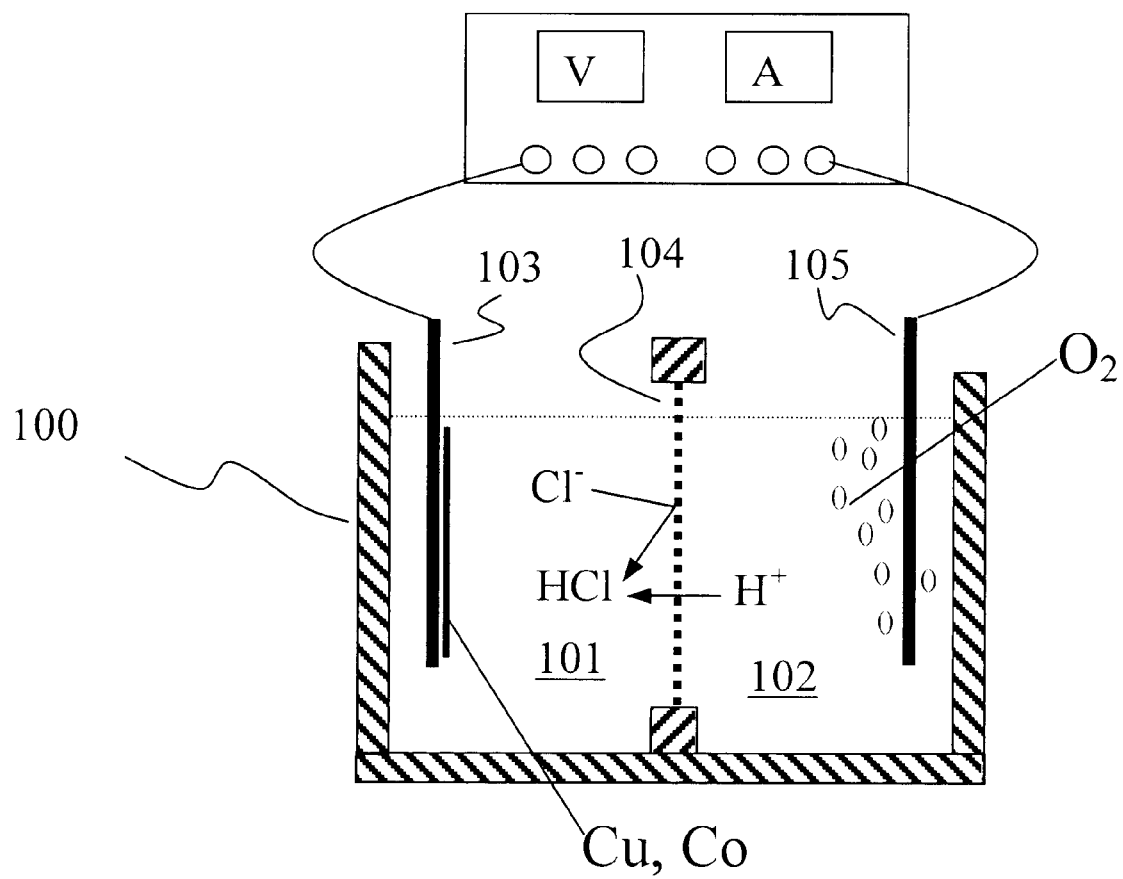
FIG. 2 is a schematic diagram of a membrane electrolysis system applicable on the present invention.

The filtrate was used as a cathode solution 101 in a membrane electrolysis system 100 as shown in FIG. 2. Furthermore, a 0.1N brine solution or boric acid solution was used as an anode solution 102. The operation current density was set at 0.001–0.01 ampere/cm$^2$, and the temperature was set at 20–80° C. to perform a membrane electrolysis (20). Metal copper (21) was formed on the surface of the cathode 103. During the electrolysis process, chlorine ions were retained in the cathode solution by the division of a cationic exchange membrane 104. Oxygen gas and hydrogen ions were formed near the anode 105. The hydrogen ions formed, under the influence of an electric field, gradually moved towards the cathode, penetrated said cationic exchange membrane 104, and formed hydrochloric acid with the chlorine ions on the cathode side. Along with the progress of electrolysis, the concentration of copper ions in the solution decreased gradually, and reached a desired level upon which the electrolysis was terminated.

Upon completion of the electrolysis, the cathode solution was adjusted to a pH value exceeding 1.5 through a pH value adjustment step (20a), which included applying a diffusion dialysis treatment on said cathode solution, thereby obtaining a hydrochloric acid aqueous solution and a solution with an elevated pH value; and, optionally, adding a sodium hydroxide to said solution with an elevated pH value in order to adjust the pH value to be over 1.5. Said hydrochloric acid aqueous solution, after adjusted by a concentrated hydrochloric acid (16), could be recycled to the dissolution step (15). Optionally, sodium hydroxide could be directly added to said cathode solution in order to adjust the pH value to be over 1.5. A diffusion dialysis treatment suitable for the present invention was not specifically limited. Any diffusion dialysis treatments in the prior art that could form hydrochloric acid from an aqueous solution of hydrochloric acid/sodium chloride containing copper, cobalt, iron, aluminum and lithium ions can be used in the present invention. For example, a DSV diffusion dialysis membrane could be used at a flow ratio of pure water to the solution of 1. Through which, a cathode solution having a pH value less than 0, after the diffusion dialysis treatment, could yield a solution having an elevated pH value of 1.0 and a hydrochloric acid aqueous solution having a pH value of 0.

Said solution with a pH value adjusted to be over 1.5 was subjected to a membrane electrolysis (22) similar to Step (20), wherein the current density was set to 0.01–0.05 ampere/cm$^2$, and the temperature at 20–80° C., thereby forming metal cobalt (23) on the cathode. Said cathode solution, at the end of the electrolysis, would contain a high concentration of lithium ions and small amounts of iron and aluminum ions remained due to an incomplete physical selection. After a pH value adjustment step (24), the pH value of said solution was adjusted to be over 5, thereby forming a precipitation of Fe(OH)$_3$ (25) and Al(OH)$_3$ (26). After filtering out the precipitation of Fe(OH)$_3$ and Al(OH)$_3$, the filtrate was added with sodium carbonate (27) in Step (28), so that the lithium ions in the filtrate would be effectively recovered as a precipitation of lithium carbonate (29).

EXAMPLE

100 Gram of the under size portion was added into 600 ml of a mixture of sodium chloride and an aqueous solution of hydrochloric acid. Wherein said mixture was prepared by adding 100 g of sodium chloride into one liter of 3 N hydrochloric acid aqueous solution. After one hour, a filtration facility was used to remove the insolubles in said mixture. The filtrate (620 ml) with a pH value less than 0 was subjected to a membrane electrolysis system equipped with a cationic exchange membrane (Nafion from Du Pont Co.) in order to recover metal copper from said filtrate. Wherein said filtrate was used as a cathode solution, a 0.1 N sodium sulfate aqueous solution was used as an anode solution, a network-like indium oxide electrode was used as an anode, and a 4.5 cm×9 cm stainless steel screen electrode was used as a cathode. Said membrane electrolysis was carried out at a current density of 0.01 A/cm$^2$ and at 30° C. for 10 hours. 4.2 Gram of copper metal with a purity of >99% was obtained. After the electrolysis, the cathode solution was subjected to a diffusion dialysis facility to recover the hydrochloric acid contained therein. Wherein said diffusion dialysis facility was produced by the Asahi Glass Engineering Co. of Japan (Model T-0b), which was equipped with a DSV dialysis membrane. Said diffusion dialysis was carried out under conditions where the flow ratio of pure water to the solution was 1, thereby obtaining 0.6 liter of 2 N hydrochloric acid aqueous solution, and 0.6 liter of a to-be-treated aqueous solution with a pH value of about 0. Said 2N hydrochloric acid aqueous solution was recycled to the abovementioned dissolution operation. Said to-be-treated aqueous solution was adjusted to a pH value of over 1.5 by using sodium hydroxide; then said aqueous solution was used as a cathode solution in the membrane electrolysis. The conditions of the membrane electrolysis were: temperature 30° C., current density 0.02 A/cm$^2$, and operation time 40 hours. Upon completion of the membrane electrolysis operation, 27.6 g of cobalt metal with a purity of 99% was obtained. After the electrolysis, the cathode solution (0.72 liter) was adjusted to a pH value of 5 by using sodium hydroxide, thereby forming a precipitation of Fe(OH)$_3$ and Al(OH)$_3$. The precipitate was removed by filtration, and the filtrate (0.68 liter) was added with 28 g of sodium carbonate, thereby forming a precipitation of lithium carbonate. After filtration and drying, 19.1 g of lithium carbonate powder was obtained.

What is claimed is:

1. A process of recovering metals from waste batteries including lithium ion batteries, wherein said waste batteries which include metals of iron, aluminum, copper, cobalt, and lithium are calcined and sieved to generate an ash containing metals and metal oxides, said process comprising the following steps:

a) dissolving said ash with a 3N–6N hydrochloric acid aqueous solution containing sodium chloride;

b) using the dissolved solution formed in step a) as a cathode solution and an aqueous solution of salt or acid as an anode solution, and using a current density of 0.001–0.01 ampere/cm$^2$ to perform a membrane electrolysis in a first electrolysis tank divided into a cathode well and an anode well by a cationic exchange membrane, thereby forming by reduction a copper metal on a cathode in said cathode well, wherein hydrogen ions formed in said anode solution penetrate through said cationic exchange membrane, and combine with the chlorine ions in said cathode solution to form hydrochloric acid;

c) withdrawing said cathode solution from said first electrolysis tank, and applying a diffusion dialysis on said cathode solution, thereby obtaining an aqueous solution of hydrochloric acid and a solution with an elevated pH value, wherein said aqueous solution of hydrochloric acid can be recycled for the use in dissolution in step a);

d) using said solution with an elevated pH value from step c) as a cathode solution and an aqueous solution of salt or acid as an anode solution, and using a current density of 0.01–0.05 ampere/cm$^2$ in a second electrolysis tank divided into a cathode well and an anode well by a cationic exchange membrane to perform a membrane electrolysis, wherein the pH value of said cathode solution is controlled to be over 1.5 during said membrane electrolysis process, thereby forming by reduction a cobalt metal on a cathode in said cathode well;

e) withdrawing said cathode solution from said second electrolysis tank, and adjusting the pH value thereof to 5–7, thereby forming a precipitation of Fe(OH)$_3$ and Al(OH)$_3$;

f) performing a solid/liquid separation on the resulting mixture from step e); and g) adding a water soluble carbonate into the aqueous solution separated in step f), thereby forming a precipitation of lithium carbonate.

2. The process as claimed in claim 1, wherein step e) comprises applying a diffusion dialysis treatment on said cathode solution, thereby obtaining an aqueous solution of hydrochloric acid and a solution with an elevated pH value, and optionally adding sodium hydroxide into said solution with an elevated pH value, wherein said aqueous solution of hydrochloric acid can be recycled for the dissolution in step a).

3. The process as claimed in claim 1, wherein the control of the pH value in step d) is performed by an addition of sodium hydroxide.

4. The process as claimed in claim 1, wherein the adjustment of the pH value in step e) is performed by an addition of sodium hydroxide.

5. The process as claimed in claim 1, wherein said water-soluble carbonate in step g) is sodium carbonate.

6. The process as claimed in claim 1 further comprising smashing the calcined product, and collecting the smashed product passing through a screen of 50-5 mesh during smashing.

7. The process as claimed in claim 6 further comprising separating said smashed product with a screen of 10-5 mesh, thereby obtaining an under size portion containing the ash containing metals and metal oxides, and a portion remained on the screen.

8. The process as claimed in claim 7 further comprising a magnetic selection process for separating iron from said retained portion.

9. The process as claimed in claim 8 further comprising using an eddy current selection process for separating copper and aluminum from a residue formed after said magnetic selection process.

10. The process as claimed in claim 1, wherein said 3N–6N hydrochloric acid aqueous solution containing sodium chloride in step a) has a concentration of sodium chloride of 50–300 g/liter.

11. The process as claimed in claim 10, wherein said 3N–6N hydrochloric acid aqueous solution containing sodium chloride in step a) has a temperature of 60–100° C., and said dissolving is carried out by using 5–20 g of said 3N–6N hydrochloric acid aqueous solution containing sodium chloride per gram of said ash.

* * * * *